April 15, 1958　　　　H. J. BUTLER　　　　2,830,679
DISC BRAKE ASSEMBLY

Filed April 12, 1955　　　　　　　　　　2 Sheets-Sheet 1

INVENTOR
Henry James Butler
by Benj. T. Rauber
his attorney

April 15, 1958 H. J. BUTLER 2,830,679
DISC BRAKE ASSEMBLY
Filed April 12, 1955 2 Sheets-Sheet 2

INVENTOR
Henry James Butler
by Benj. T. Rauber
his attorney

United States Patent Office 2,830,679
Patented Apr. 15, 1958

2,830,679

DISC BRAKE ASSEMBLY

Henry James Butler, Sutton Coldfield, England, assignor to Dunlop Rubber Company Limited, London County, England, a British company Application April 12, 1955, Serial No. 500,964

Claims priority, application Great Britain May 4, 1954

6 Claims. (Cl. 188—72)

My invention relates to disc brake assemblies and particularly to disc brake assemblies for motor vehicles and the like.

Brake discs for vehicle disc brakes, particularly discs associated with the rear wheels of the vehicle, are liable to deflection from the vertical and to lateral oscillation or "out-of-truth" due to bowing of the rear axle under load or when the vehicle corners or when it runs on a steeply cambered road. When this occurs it is difficult efficiently to apply the brakes since the non-rotatable braking members are not subject to the same distortion and thus the friction pads may contact only a minor portion of the disc.

My invention provides disc brake wherein this disadvantage is overcome and provides a vehicle disc brake which is compact, efficient in operation and which is operable both hydraulically and mechanically as, e. g., by a hand lever.

According to my invention a disc brake comprises a rotatable disc, angularly-movable pressure plates axially aligned one on each side of the disc and each secured at one end by a pivotal connection to a bracket, pads of friction material secured to said plates to frictionally engage opposite faces of said disc, means associated with a mechanism for effecting said engagement and a pivotal connection between said bracket and a non-rotatable part of a wheel assembly, whereby said pressure plates accommodate themselves to deflections of the disc from a vertical plane.

Preferably the housing straddles the outer periphery of the disc and a pressure plate is pivotally secured at one end to each limb of the housing. The housing is in turn pivotally connected to a non-rotatable bracket, e. g. a bracket secured to the axle casing, the axis of said latter pivotal connection being substantially at right-angles to the axes of the pivotal connections between the housing and the plates. Thus accommodation of the pressure plate to out-of-truth movement of the disc in two separate planes is provided.

An embodiment of the invention is illustrated, by way of example, in the accompanying drawings of which:

Figure 1:
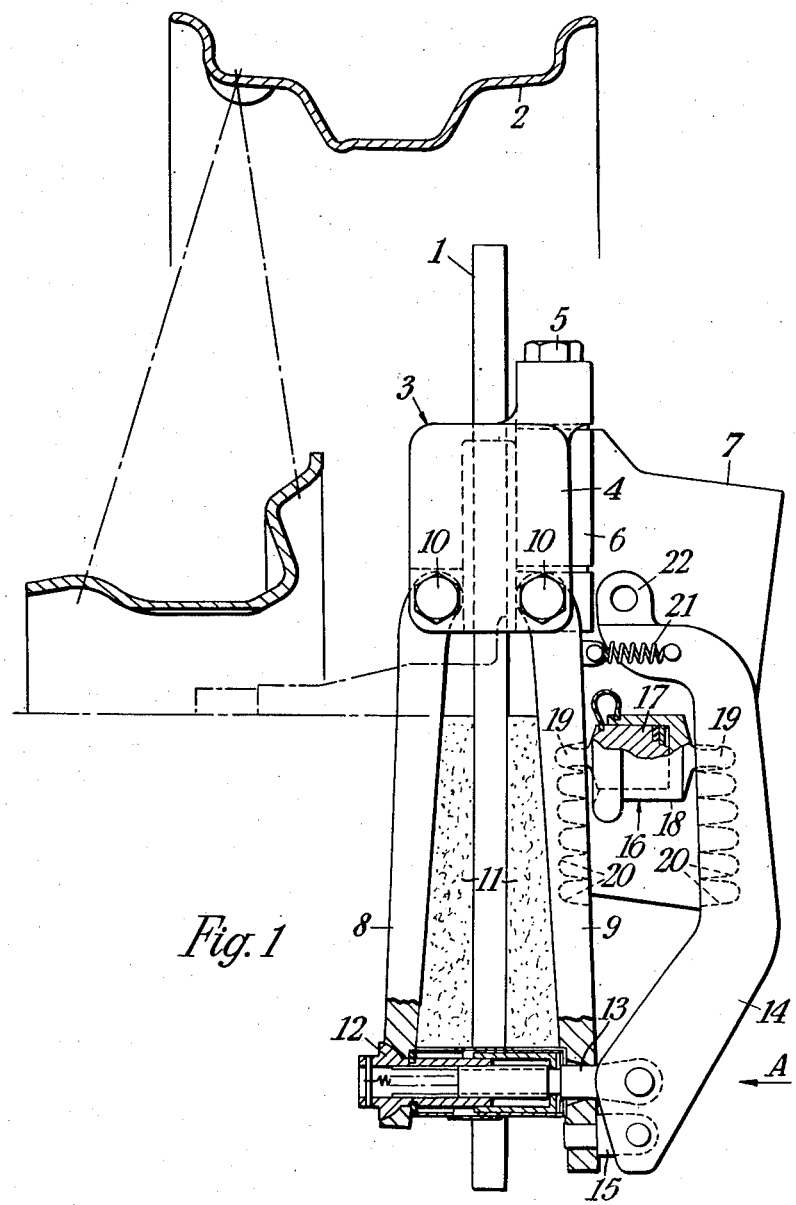
Figure 1 is a part-sectional view of a disc brake and wheel assembly constructed according to the invention.
Figure 2:
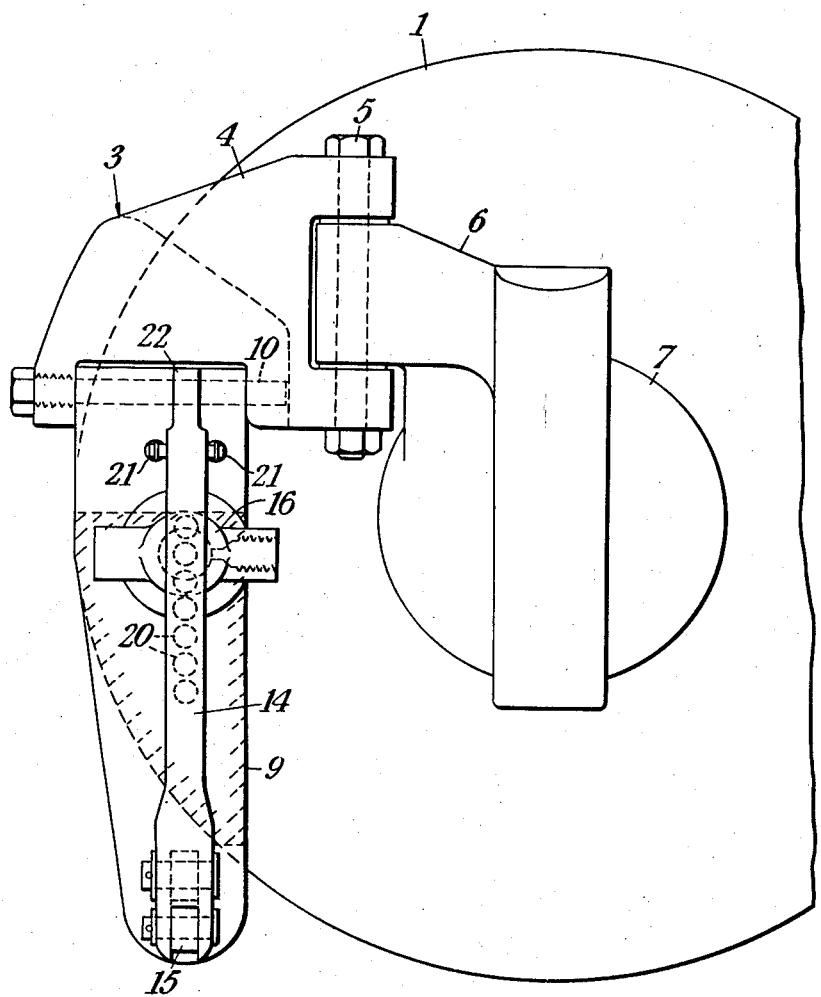
Figure 2 is a view of the disc brake of Figure 1 looking in the direction of arrow A of that figure.

In this embodiment the disc brake comprises an annular disc 1 secured to and rotatable by a vehicle wheel 2. A caliper type housing 3 straddles the outer periphery of the disc 1 and one limb 4 of the housing 3, on one side of the disc 1, is bifurcated and is pivotally secured, by means of a nut and bolt assembly 5, to a bracket 6 extending from the non-rotatable axle casing 7 of the wheel assembly. The housing 3 is thus pivotable about the nut and bolt assembly 5 within the limits imposed by the clearance between the limbs of the housing 3 and the disc 1, and the nut and bolt assembly 5 is mounted with its axis normal to the ground, so that the housing 3 swings parallel to the ground.

Two elongated pressure plates 8, 9 are provided axially-aligned one on each side of the disc. One end of each plate 8, 9 is pivotally connected to one side of a limb of the housing 3, the other ends thereof projecting beyond the outer periphery of the disc. The pressure plates 8, 9 are each pivotable on pins 10 which extend through a bifurcated portion of each limb of the housing 3 and the axes of the pins 10 are substantially at right-angles to the axis of the nut and bolt assembly 5 and are parallel to the plane of the disc, so that the pressure plates 8, 9 extend substantially downwardly from the housing 3. Each pressure plate has secured thereto a pad of friction material 11 to frictionally engage an adjacent face of the disc.

The ends of the two pressure plates 8, 9 remote from the housing 3 are provided with a device for compensating for wear of the friction pads 11 and for maintaining a constant clearance between said pads 11 and the adjacent faces of the disc 1. Said device, which is more fully described in British Patent No. 712,534 comprises two parts 12, 13 screwed together and extending axially adjacent the outer periphery of the disc, one part 12 being rockably associated with one pressure plate 8 and the other part extending through a hole in the adjacent end of the other pressure plate 9, i. e. the pressure plate remote from the wheel web or spokes, and being pivotally secured adjacent one end of an operating lever 14. Said lever 14 lies adjacent and in line with the adjacent pressure plate 9 and a member 15 is provided, between said pressure plate 9, at the end thereof remote from the housing 3, and the lever 14, about which the lever 14 pivots when it is angularly moved in one direction.

The operating lever 14 is cranked to provide a central portion bent away from the adjacent pressure plate 9 and a hydraulically operated piston and cylinder mechanism 16 is detachably secured between said central portion and the pressure plate 9. The piston 17 and cylinder 18 are each provided at opposite ends with an axially aligned peg 19 which fits into one of a number of holes 20 provided for it in the lever 14 and pressure plate 9 respectively. Thus by altering the position of the piston and cylinder mechanism 16 relative to the member 15 the mechanical advantage of the lever 14 may be varied. The cylinder 18 is connected, by means of a flexible pipe (not shown), with a source of fluid pressure, e. g. a master cylinder.

A tension spring 21 is fitted between the end of the lever 14 adjacent the housing 3 and associated pressure plate 9 to return the lever 14 to its non-operative position after each application of the brake and said end of the lever 14 is provided with means 22 whereby a cable or the like may be secured thereto, so that the brake may be operated mechanically.

The operation of the brake is as follows. The disc 1 rotates with the wheel 2 and on the brake being applied while the disc 1 is running in an "out-of-truth" condition the pressure plates 8, 9 and friction pads 1 are able, by virtue of the double pivotal connection between them and the non-rotatable part of the wheel, to fully accommodate themselves to this "out-of-truth" with the effect that the brakes can be effectively applied at all times.

The brake may be applied either hydraulically or mechanically or both together and by varying the location of the hydraulic piston and cylinder mechanism 16 the braking ratios of the front and rear brakes may be varied as desired using the same standard brake. The brake is neat and compact and is efficient in operation.

Having now described my invention, what I claim is:

1. A disc type brake comprising an annular, rotatable, brake disc secured to a rotatable part of a vehicle, a non-rotatable structure having a bracket extending therefrom, a bifurcated housing straddling a portion of the periphery of said disc and pivotally attached to said bracket by a vertical pivot pin to pivot in one plane, a pair of pressure plates pivotally attached one to each bifurcation of said housing to pivot in a plane substantially at right angles to the pivotal plane of said bracket and extending chordally across said disc with their free ends extending beyond the periphery thereof, a pad of friction material attached to each said pressure plate on the side thereof adjacent said disc, and means connecting said free ends of said pressure plates and operable to draw said free ends together to force said pads of friction material into frictional contact with the opposite radial faces of said disc.

2. A disc brake according to claim 1 wherein each said pressure plate is pivotally attached to a said bifurcation by a substantially horizontal pivot pin.

3. A disc brake according to claim 1 wherein the means operable to draw together said free ends of said pressure plates comprise a pin loosely passing through the free end of one said pressure plate and secured in the other said pressure plate, an operating lever pivoted in the free end of said pin and also pivotally supported on said first-named pressure plate, and means pivotally attached to the free end of said operating lever and operable to pivot said operating lever about the bracket attached to said first-named pressure plate to squeeze together said pressure plates and press said friction pads against the radial faces of said disc.

4. A disc brake according to claim 3 comprising a fluid pressure operated mechanism disposed between said first-named pressure plate and said operating lever and operable to actuate said lever independently of said means pivotally attached to the free end of said operating lever.

5. A disc brake according to claim 4 comprising means whereby the location of said fluid-pressure operated mechanism relative to said operating lever and said one pressure plate may be adjusted to vary the mechanical advantage exerted by said operating lever.

6. A disc type brake comprising an annular, rotatable, brake disc secured to a rotatable part of a vehicle, a non-rotatable structure having a bracket extending therefrom, a bifurcated housing straddling a portion of the periphery of said disc and pivotally attached to said bracket to pivot in one plane, a pair of pressure plates pivotally attached one to each bifurcation of said housing to pivot in a plane substantially at right angles to the pivotal plane of said bracket and extending chordally across said disc with their free ends extending beyond the periphery thereof, a pad of friction material attached to each said pressure plate on the side thereof adjacent said disc, and means connecting said free ends of said pressure plates and operable to draw said free ends together to force said pads of friction material into frictional contact with the opposite radial faces of said disc, wherein the axially spaced relationship of said pressure plates may be adjusted to compensate for friction pad wear.

References Cited in the file of this patent
UNITED STATES PATENTS

| | | |
|---|---|---|
| 1,619,542 | Riedinger | Mar. 1, 1927 |
| 2,180,092 | Oelkers | Nov. 14, 1939 |
| 2,266,059 | Milan | Dec. 16, 1941 |
| 2,375,152 | Turner | May 1, 1945 |
| 2,655,230 | Buyze | Oct. 13, 1953 |